March 23, 1954     E. W. PLANALP     2,673,091
FOUR-WHEEL CABLE CONTROLLED STEERING MECHANISM
Filed March 27, 1953
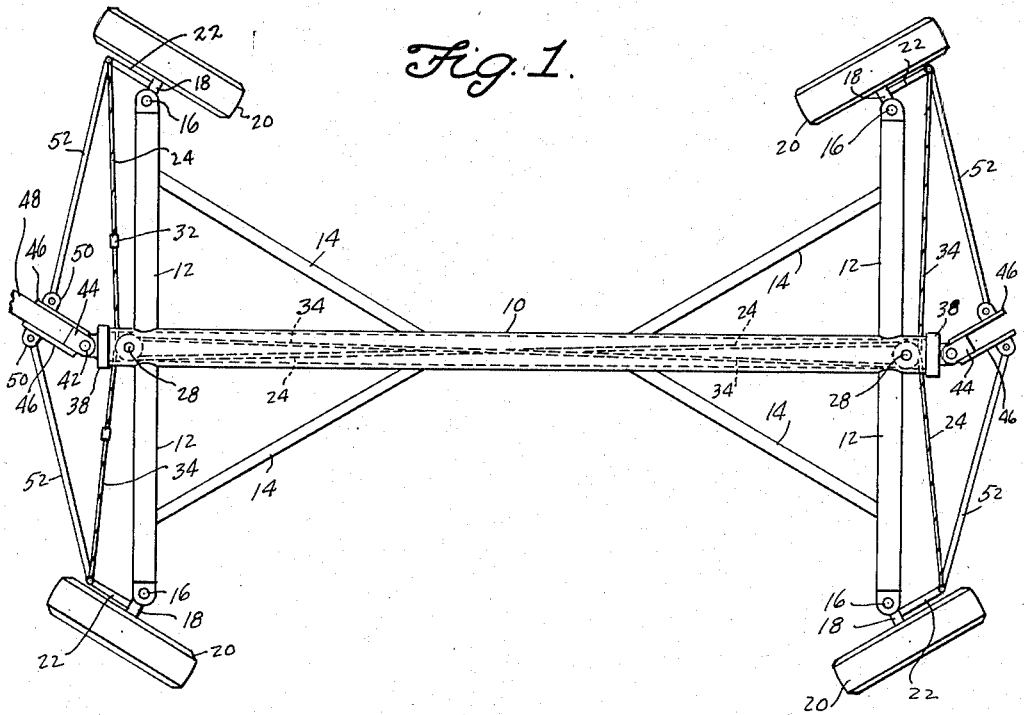
Fig. 1.
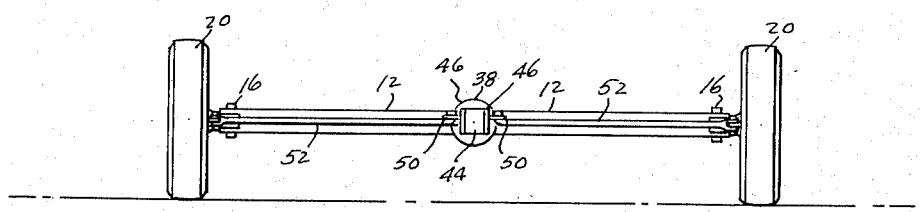
Fig. 2.
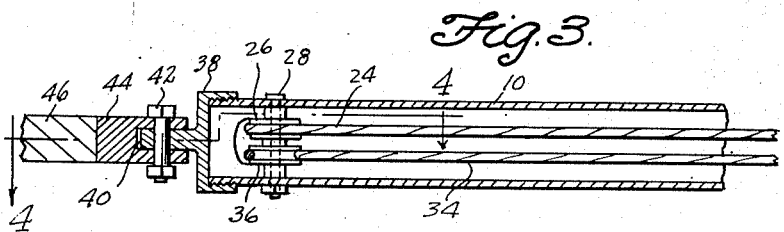
Fig. 3.
Fig. 4.
INVENTOR.
Eldon W. Planalp,
BY
McMorrow, Berman & Davidson
ATTORNEYS Patented Mar. 23, 1954

2,673,091

UNITED STATES PATENT OFFICE 2,673,091

FOUR-WHEEL CABLE CONTROLLED STEERING MECHANISM

Eldon W. Planalp, Cincinnati, Ohio

Application March 27, 1953, Serial No. 344,962

2 Claims. (Cl. 280—103)

This invention relates to steering mechanisms, and, more particularly, has reference to a cable operated steering means which, when mounted upon a four wheeled vehicle, can be operated from either end of the vehicle, and will be effective to turn the wheels at one end of the vehicle in one direction, while simultaneously turning the wheels at the other end of the vehicle in an opposite direction.

In carrying out the invention, I propose to provide a vehicle which can be moved in one direction, and then moved in an opposite direction without requiring that the vehicle be turned around, the vehicle being readily steered from either end.

The invention can be advantageously used, I believe, on vehicles such as wagons drawn behind corn pickers. Ordinarily, a wagon of this type becomes full of corn at the front end thereof, and the corn must be shoveled to the rear. A vehicle formed in accordance with the present invention, however, can be filled at one end and then turned around and filled in the other end. In this instance, the turning of the vehicle becomes practical where it has not heretofore been practical with respect to conventional wagons, the steering mechanism which I have devised being such as to permit the turning radius of the vehicle to be reduced to such an extent as to make the wagon highly maneuverable.

Another important object is to provide a steering mechanism as stated which, when incorporated in a plurality of wagons or other vehicles, permits said vehicles to be hitched together, in such a manner as to cause all of them to follow in the tracks of the leading vehicle while making turns.

Another important object is to provide a steering mechanism as stated which can be used to advantage not only on drawn vehicles, but also on self-propelled or traction vehicles.

Other objects will appear from the following description, the claims appended thereto, and from the annexed drawing, in which like reference characters designate like parts throughout the several views, and wherein:

Figure 1 is a top plan view of a vehicle chassis equipped with a steering mechanism formed in accordance with the present invention;

Figure 2 is an end elevational view;

Figure 3 is an enlarged, fragmentary, longitudinal sectional view through the tubular cable housing of the invention; and Figure 4 is a sectional view taken substantially on line 4—4 of Figure 3.

The reference numeral 10 has been applied in the drawing to an elongated cable housing, said housing being formed as a tubular member of circular cross sectional shape. To each end of the housing there is fixedly attached a pair of wheel support members 12. The members of each pair are welded or otherwise fixedly attached at their inner ends to diametrically opposite portions of the associated end portion of housing 10, and project laterally in opposite directions from the housing, being arranged normally to the housing and disposed in a horizontal plane common to that within which the housing extends.

To rigidify the connection of the members 12 to the housing 10, braces 14 are used, said braces being connected fixedly at their opposite ends to the housing and to the respective wheel support members.

Mounted in the outer ends of the several members 12 are vertically disposed, short pins 16, and pivotally connected at their inner ends to said pins are horizontally extending, short wheel spindles 18 secured at their outer ends to the wheels 20 of the vehicle.

Steering arms 22 are rigid at one end with the respective spindles 18, and extend in planes parallel to the planes in which the wheels 20 lie, the spindles 18 being extended normally to said planes. The arms 22 at one end of the vehicle extend in a direction away from the other end of the vehicle, as will be readily noted from Figure 1.

For the purpose of steering all four wheels simultaneously, a pair of cables is used, one of said cables being designated by the reference numeral 24 and being attached, at one end, to one of the steering arms 22, this being the steering arm shown at the upper left-hand corner of Figure 1.

From said steering arm, cable 24 extends through an opening formed in the adjacent end of housing 10, and is trained about a pulley 26 (Figure 3). After being trained about the pulley 26, the cable 24 is extended longitudinally of the housing 10, being trained, at the other end of the housing, about a second pulley 26. Thereafter the cable 24 is extended out of said other end of the housing, shown as the right-hand end in Figure 1, and is connected to that steering arm 22 shown at the lower right-hand corner of Figure 1.

The respective pulleys 26 are rotatably mounted on vertically disposed pins 28 mounted in the opposite ends of the tubular housing 10. It will be noted, in this regard, that adjacent said pins 28 and pulleys 26, side openings 30 are formed in the tubular housing, to permit extension of the cables to and from the respective pulleys of the mechanism.

It is, of course, desirable that means be incorporated in the device for adjusting the cables as to the tension thereof, and accordingly, turnbuckle elements 32 are utilized, one or more of said elements being provided on each cable, intermediate the opposite ends of said cable.

A second cable has been designated by the reference numeral 34, and is connected, at one end, to that steering arm 22 shown at the lower left-hand corner of Figure 1. The cable 34 includes a turnbuckle element, and is trained, as shown in Figure 3, about a pulley 36 rotatably mounted upon pin 28 below pulley 26. Thereafter, cable 34 is extended the length of and within the tubular housing 10, and is trained about a second pulley 36. Thereafter, the cable 34 is extended out of the right-hand end of the housing, considering the housing as it appears in Figure 1, and is connected to that steering arm 22 shown at the upper right-hand corner of Figure 1.

The opposite ends of the housing 10 are externally threaded, for engagement with the internally threaded peripheral flanges of caps 38 having outwardly extended, flat lugs 40. The respective lugs 40 have openings formed therein, receiving vertically disposed connecting pins 42, the pins 42 passing through transversely aligned openings formed in the spaced arms of yokes 44, said arms of the yokes receiving the lugs 40 between them.

Lugs 40 are identical at the opposite ends of the device, as are the yokes 44.

Each yoke 44 has rigidly mounted thereon transversely spaced, parallel side plates 46, and extendable between and connectible to the side plates are tongues 48. One tongue 48 would usually be associated with each individual vehicle, and it will be understood that the tongue 48 would be removably connected to the side plates, thus to permit the tongue to be disconnected from the side plates at one end of the vehicle, and shifted to the other end of the vehicle, for connection to the side plates 46 at said other end of the vehicle.

Rigid with and extending outwardly from the side plates 46 are ears 50, to which are pivotally connected the inner ends of tie rod 52. The outer ends of the several tie rods 52 are pivotally connected to the outer ends of the several steering arms 22.

By reason of the construction illustrated and described, it will be apparent that if, for example, the tongue 48 shown at the left in Figure 1 is swung about its pivot axis 42 in a clockwise direction, to the position thereof shown in Figure 1 the wheels 20 at the left in Figure 1 will be turned in a clockwise direction about the centers defined by pins 16. At the same time, the wheels 20 at the right-hand end of the vehicle as shown in Figure 1 will be turned about their centers 16 in an opposite, counterclockwise direction.

This simultaneous turning of the wheels at opposite ends of the vehicle in opposite directions is accomplished by the particular cable and pulley arrangement, and the particular tie rod arrangement, illustrated and shown. It will be seen that by reason of this arrangement, the turning radius of the vehicle will be sharply reduced, since the lead wheels and trailing wheels will be so turned as to cause said trailing wheels to follow in the tracks of the lead wheels.

Further, the steering mechanism illustrated and described is such as to permit the vehicle to be steered from either end, or drawn from either end. Regardless of the ends to which the tongue 48 is attached, the steering action described above will obtain, and this will be true whether the vehicle is of the drawn or of the self-propelled, traction type.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A steering mechanism for vehicles comprising, in combination with pairs of steerable wheels disposed at opposite ends of a vehicle, an elongated, tubular housing extending between said pairs longitudinally and centrally of the vehicle; wheel support members extending laterally from the ends of the housing, said wheels being swingably connected to said members; a pair of vertically spaced, upper and lower pulleys mounted in each end of the housing; a pair of cables trained about said pulleys and extending within the housing, said cables being connected at their ends to said wheels to link the wheels for turning of the wheels at one end of the vehicle in one direction, simultaneously with turning of the wheels at the other end of the vehicle in an opposite direction, one of said cables being trained about the upper pulleys and the other cable being trained about the lower pulleys with each cable being connected at its ends to wheels at opposite sides and opposite ends of the vehicle; yokes pivotally mounted upon the opposite ends of the housing; and tie rods extending from each yoke to the wheels at the same end of the vehicle, to provide means controllable by an operator for turning the wheels at said end in a selected direction.

2. A steering mechanism for vehicles comprising, in combination with pairs of steerable wheels disposed at opposite ends of a vehicle, an elongated, tubular housing extending between said pairs longitudinally and centrally of the vehicle; wheel support members extending laterally in opposite directions from the ends of the housing; wheel spindles pivotally connected to the outer ends of said members for horizontal swinging movement and secured to said wheels; steering arms rigid with said spindles for swinging the same to turn said wheels; a pair of vertically spaced, upper and lower pulleys mounted in each end of the housing; a pair of cables trained about said pulleys and extending within the housing, said cables linking the wheels for turning of the wheels at one end of the vehicle in one direction, simultaneously with turning of the wheels at the other end of the vehicle in an opposite direction, one of said cables being trained about the upper pulleys and the other cable being trained about the lower pulleys with each cable being connected at its ends to the steering arms of wheels disposed at opposite sides and opposite ends of the vehicle; yokes pivotally mounted upon the opposite ends of the housing; and tie rods extending from each yoke to the steering arms of the wheels at the same end of the vehicle, to provide means controllable by an operator for turning the wheels at said end in a selected direction.

ELDON W. PLANALP.

References Cited in the file of this patent

UNITED STATES PATENTS

| Number | Name | Date |
|---|---|---|
| 646,563 | Smithson et al. | Apr. 3, 1900 |
| 882,358 | Todd | Mar. 17, 1908 |
| 1,691,020 | Brinton | Nov. 6, 1928 |
| 1,877,201 | Rightmire | Sept. 13, 1932 |
| 2,318,245 | McFarland | May 4, 1943 |
| 2,483,684 | Williams | Oct. 4, 1949 |
| 2,651,526 | Eubanks | Sept. 8, 1953 |

FOREIGN PATENTS

| Number | Country | Date |
|---|---|---|
| 5,983 | Great Britain | Sept. 13, 1906 |
| 809,013 | Germany | July 23, 1951 |